(12) United States Patent
Nakano

(10) Patent No.: US 6,813,482 B1
(45) Date of Patent: Nov. 2, 2004

(54) RADIO COMMUNICATION APPARATUS AND METHOD

(75) Inventor: Yoshikazu Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 470 days.

(21) Appl. No.: 09/696,820

(22) Filed: Oct. 26, 2000

(30) Foreign Application Priority Data

Mar. 27, 2000 (JP) ........................................ 2000-086702

(51) Int. Cl.⁷ .............................................. H04B 1/06
(52) U.S. Cl. ...................... 455/257; 455/75; 455/192.2; 455/182.2
(58) Field of Search ................................ 455/257, 256, 455/192.2, 182.2, 259, 75, 255, 265, 296, 276.1, 260, 139, 205, 313; 375/147, 344, 331, 332, 219, 371, 362, 329; 370/215, 284, 491

(56) References Cited

U.S. PATENT DOCUMENTS

| | | | | |
|---|---|---|---|---|
| 5,422,917 A | * | 6/1995 | Scott ........................... 375/371 |
| 5,493,710 A | * | 2/1996 | Takahara et al. .......... 455/192.2 |
| 5,497,160 A | * | 3/1996 | Koehler et al. ............. 342/145 |
| 5,838,737 A | * | 11/1998 | Yamaguchi et al. ........ 375/331 |
| 5,918,161 A | * | 6/1999 | Kumar et al. ................. 455/65 |
| 6,188,716 B1 | * | 2/2001 | Emery et al. ................ 375/147 |
| 6,363,102 B1 | * | 3/2002 | Ling et al. .................. 375/147 |
| 6,535,549 B1 | * | 3/2003 | Scott et al. ................. 375/219 |
| 2002/0097820 A1 | * | 7/2002 | Simmons et al. ........... 375/344 |

FOREIGN PATENT DOCUMENTS

| | | |
|---|---|---|
| JP | 6-318963 | 11/1994 |
| JP | 11-41068 | 2/1999 |

* cited by examiner

Primary Examiner—Edward F. Urban
Assistant Examiner—C. Chow
(74) Attorney, Agent, or Firm—Katten Muchin Zavis Rosenman

(57) ABSTRACT

An amount-of-correction extracting unit detects a deviation angle from a phase of a reference signal point of phase information contained in a received signal, and determines an amount of correction based on the deviation angle. On a transmission side, transmission data is converted into a pair of amplitude data corresponding to a signal point of the transmission data. The amount of correction is added to the phase of the signal point indicated by the pair of amplitude data. A carrier wave for transmission is modulated by the pair of amplitude data after correction, and is then transmitted. Thus, it is possible to transmit the modulated wave which varies in accordance with the frequency precision of the other communication party.

10 Claims, 11 Drawing Sheets

RADIO COMMUNICATION APPARATUS AND METHOD

BACKGROUND OF THE INVENTION

1. Field of the Invention

The present invention generally relates to an automatic frequency control (AFC) in a mobile communication system in which the carrier phase varies. More particularly, the present invention is concerned with an AFC circuit capable of suppressing deterioration of demodulated data due to a frequency error of the carrier wave caused between the transmitter and receiver.

2. Description of the Related Art

There is a radio communication system in which voice communication or data communication takes place between a mobile station and a radio communication apparatus provided in a base station (hereinafter, such an apparatus is simply referred to as "base station" by a radio wave. If there is a frequency difference between the carrier waves on the transmission and reception sides, the quality of demodulated data will deteriorate greatly. Deterioration of the quality of demodulated data may specifically cause deformation of the signal waveform, or increase in the error rate of the received signal. Further, leakage of power to an adjacent channel may increase.

In order to avoid an occurrence of the situations mentioned above, an AFC circuit is conventionally provided in demodulation circuits of both the base station and the mobile station to correct a carrier frequency error.

When a frequency error caused in one of the transmission and reception sides is equal to an upper limit of a tolerable range and a frequency error caused in the other side is equal to a lower limit thereof, the frequency difference to be corrected by the AFC circuit is twice the tolerable range of the frequency error. The AFC circuit is thus required to have an ability of correcting the frequency over a wide range. When taking into account the above, the practical AFC circuit and a demodulation circuit including it have a large size.

In a radio communication apparatus in conformity with a personal digital cellular (PDC) system, a unique technique directed to correcting a carrier frequency error with a reduced load on the reception side has been developed. In this case, error correction is made on the transmission side in addition to the reception side on which error correction is passively made. A high-precision reference clock oscillator is provided in the radio communication apparatus. The AFC correction using the reference clock is made at the time of not only reception but also transmission. More particularly, the station detects a carrier frequency error between its own station and the remote station from the received signal. A control voltage corresponding to the carrier frequency error is produced and applied to the reference clock oscillator such as a voltage controlled-temperature compensated oscillator (VC-TCXO). The output signal of the reference clock oscillator is applied to a local oscillator on the transmission side, so that a local oscillation signal is produced. Thus, the frequency error of the carrier for transmission can be absorbed.

In practice, it is required to provide, in the base station, high-precision reference clock oscillators that are equal in number to mobile stations which may concurrently take communications and to simultaneously make frequency error corrections with respect to the mobile stations. The high-precision reference clock oscillators formed of VC-TCXOs are very expensive, and therefore raise the production cost of the base station.

SUMMARY OF THE INVENTION

It is a general object of the present invention to provide a radio communication apparatus and method in which the above disadvantages are eliminated.

A more specific object of the present invention is to provide a radio communication apparatus having a simple structure capable of transmitting a wave to be modulated having a relatively reduced frequency error in accordance to the other party.

Another object of the present invention is to provide a radio communication method capable of simply preventing degradation of the quality of decoded data.

The above objects of the present invention are achieved by a radio communication apparatus in which a received signal is demodulated using an output signal of a local oscillator, and the output signal of the local oscillator is modulated by a modulating signal including transmission information and is then transmitted, said radio communication apparatus comprising: a first unit detecting a frequency difference between the received signal and the output signal of the local oscillator; a second unit determining an amount of correction based on the frequency difference detected by the first unit; and a third unit applying the amount of correction determined by the second unit to the modulating signal.

A first radio communication method directed to achieve the above objects of the present invention is configured as follows. A radio communication method, in which a received signal is demodulated using an output signal of a local oscillator, and the output signal of the local oscillator is modulated by a modulating signal including transmission information and is then transmitted, comprises the steps of: (a) detecting a frequency difference between the received signal and the output signal of the local oscillator; (b) determining an amount of correction based on the frequency difference detected by the step (a); and (c) applying the amount of correction determined by the step (b) to the modulating signal.

A second radio communication method is configured so that, a received signal is demodulated using an output signal of a local oscillator, and the output signal of the local oscillator is modulated by a modulating signal including transmission information and is then transmitted, the radio communication method comprising the steps of: (a) detecting a frequency difference between the received signal and the output signal of the local oscillator; (b) determining an amount of correction based on the frequency difference detected by the step (a); (c) storing the amount of correction for every information unit; and (d) applying, to the modulation signal of a desired information unit, the amount of correction corresponding to said desired information unit.

The radio communication apparatus of the present invention can have various configurations. For example, the unit that acts as a correction unit may add the amount of correction to amplitude data or phase information. The decoding method may use differential decoding and any scheme other than the differential decoding. The present invention includes a communication which takes place in an information unit such as a slot in time division multiple access (for example, PHS or PDC) or a channel code in code division multiple access. The present invention includes the following radio communication apparatus.

A first radio communication apparatus is directed to adding the amount of correction to amplitude data, and includes: a first unit receiving a phase-modulated signal; a second unit extracting phase information from the phase-modulated signal received by the first unit by using an output signal of a local oscillator; a third unit detecting a deviation angle from a phase of a reference signal point of the phase information and determining an amount of correction based on the deviation angle; a fourth unit converting transmission data into a first pair of amplitude data corresponding to a signal point thereof; a fifth unit outputting a second pair of amplitude data corresponding to a phase obtained by adding the amount of correction to the phase of the signal point indicated by the first pair of amplitude data; and a sixth unit modulating the output signal of the local oscillator by using the second pair of amplitude data output by the fifth unit.

A second radio communication apparatus is intended to add the amount of correction to phase information, and includes: a first unit receiving a phase-modulated signal; a second unit extracting phase information from the phase-modulated signal received by the first unit by using an output signal of a local oscillator; a third unit detecting a deviation angle from a phase of a reference signal point of the phase information and determining an amount of correction based on the deviation angle; a fourth unit converting transmission data into phase information concerning a signal point thereof; a fifth unit adding the amount of correction to the phase information; a sixth unit converting the phase information with the amount of correction added thereto into a pair of amplitude data; and a seventh unit modulating the output signal of the local oscillator by using the pair of amplitude data obtained by the sixth unit.

A third radio communication apparatus employs differential decoding and adds the amount of correction to amplitude data. This apparatus includes: a first unit receiving a signal obtained by differential encoding; a second unit delay-detecting the signal received by the first unit by using an output signal of a local oscillator, so that an amount of phase shifting is extracted; a third unit determining an amount of correction based on an amount obtained by subtracting a reference amount of phase shifting from the extracted amount of phase shifting; a fourth unit outputting an integrated amount of correction; a fifth unit converting transmission data into a first pair of amplitude data corresponding to a signal point thereof; a sixth unit outputting a second pair of amplitude data corresponding to a phase obtained by adding the integrated amount of correction to the phase of the signal point indicated by the first pair of amplitude data; and a seventh unit modulating the output signal of the local oscillator by using the second pair of amplitude data output by the sixth unit.

A fourth radio communication apparatus employs differential decoding and adds the amount of correction to phase information. This apparatus includes: a first unit receiving a signal obtained by differential encoding; a second unit delay-detecting the signal received by the first unit by using an output signal of a local oscillator, so that an amount of phase shifting is extracted; a third unit determining an amount of correction based on an amount obtained by subtracting a reference amount of phase shifting from the extracted amount of phase shifting; a fourth unit outputting an integrated amount of correction; a fifth unit converting transmission data into phase information corresponding to a signal point thereof; a sixth unit outputting adding the integrated amount of correction to the phase information; a seventh unit converting the phase information with the integrated amount of correction added thereto output by the sixth unit into a pair of amplitude data; and an eighth unit modulating the output signal of the local oscillator by using the pair of amplitude data output by the seventh unit.

A fifth radio communication apparatus employs a CDMA system and includes: a first unit despreading a received signal from a party with which said radio communication apparatus communicates and detecting a deviation angle per pilot block due to a frequency error between the party and said radio communication apparatus by subjecting the despread received signal to a pilot synchronous detection; a second unit determining an amount of correction based on the deviation angle detected by the first unit; a third unit converting transmission data to be sent to the party into phase information concerning a signal point; a fourth unit adding the amount of correction to the phase information; a fifth unit converting the phase information with the amount of correction added thereto output by the fourth unit into a pair of amplitude data; and a sixth unit modulating a carrier wave for transmission by the pair of amplitude data output by the fifth unit and transmitting the modulated carrier wave to the party.

A sixth radio communication apparatus communicates with a remote party in an information unit, and includes: a first unit receiving, in the information unit, a phase-modulated signal from a party with which said radio communication apparatus communicates; a second unit extracting phase information contained in at least one information unit of the phase-modulated signal received by the first unit; a third unit detecting a deviation angle from a phase of a reference signal point of phase information concerning the information unit; a fourth unit determining an amount of correction based on the deviation angle detected by the third unit; a fifth unit storing the amount of correction determined by the fourth unit in the information unit; a sixth unit converting transmission data in the information unit into phase information of a signal point thereof; a seventh unit adding the amount of correction to the phase information in the information unit; an eighth unit converting the phase information with the amount of correction added thereto output by the seventh unit into a pair of amplitude data; and a ninth unit modulating a carrier wave in the information unit by using the pair of amplitude data and transmitting the modulated carrier wave to the party.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will be now given of embodiments of the present invention in which the present invention is applied to a mobile communication system.

(First Embodiment)

A mobile communication system involved with a first embodiment of the present invention includes a base station which includes a radio communication apparatus and a mobile station according to the first embodiment of the present invention. The AFC correction can be made in either the base station or the mobile station. However, the following description is related to a case where the AFC correction is made in only the base station.

Figure 1:
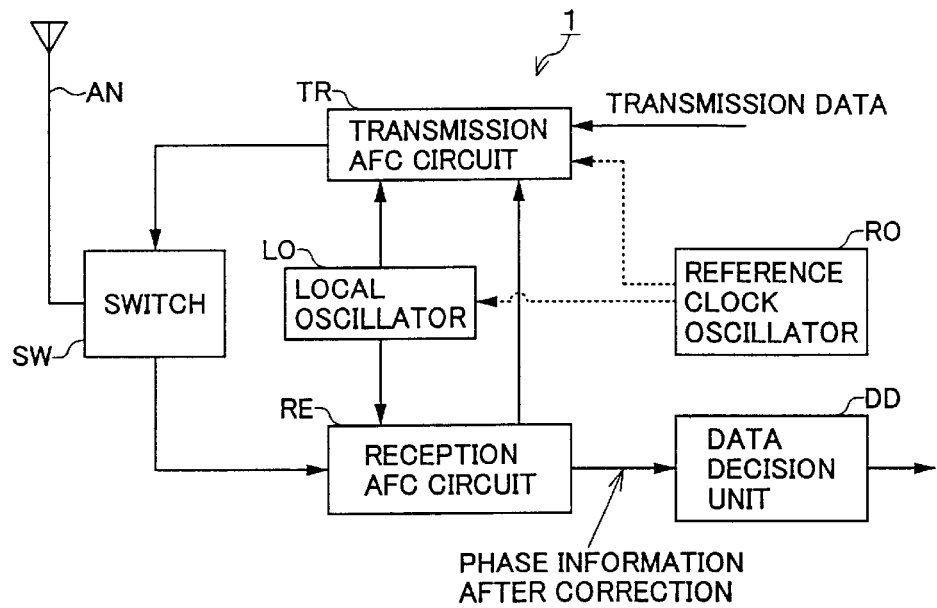
FIG. 1 is a block diagram of an entire configuration of a base station to which the present invention is applied.

FIG. 1 is a block diagram of a base station (radio communication apparatus) according to the first embodiment of the present invention. The base station shown in FIG. 1 includes an antenna AN shared in transmission and reception, a switch SW, a local oscillator LO, a transmission AFC circuit TR, a reception AFC circuit RE, a reference clock oscillator RO, and a data decision unit DD. The reception AFC circuit RE and the following data decision unit DD are components of a reception system of the base station. The transmission AFC circuit TR is a component of a transmission system of the base station. The switch SW passes a signal received by the antenna AN to the reception AFC circuit RE, and passes a signal from the transmission system to the antenna AN.

The reception AFC circuit RE and the transmission AFC circuit TR are supplied with a local signal for frequency conversion oscillated by the local oscillator LO. A reference clock oscillated by the reference clock oscillator RO is supplied to the local oscillator LO and the transmission AFC circuit TR. The reference clock is used to define the operation timings of the entire radio communication apparatus. The reference clock oscillator RO is not required to vary the output frequency for the transmission AFC process with respect to only one mobile station. Thus, the output signal of the reference clock oscillator can be used at the time of transmissions respectively directed to other mobile stations.

Figure 2:
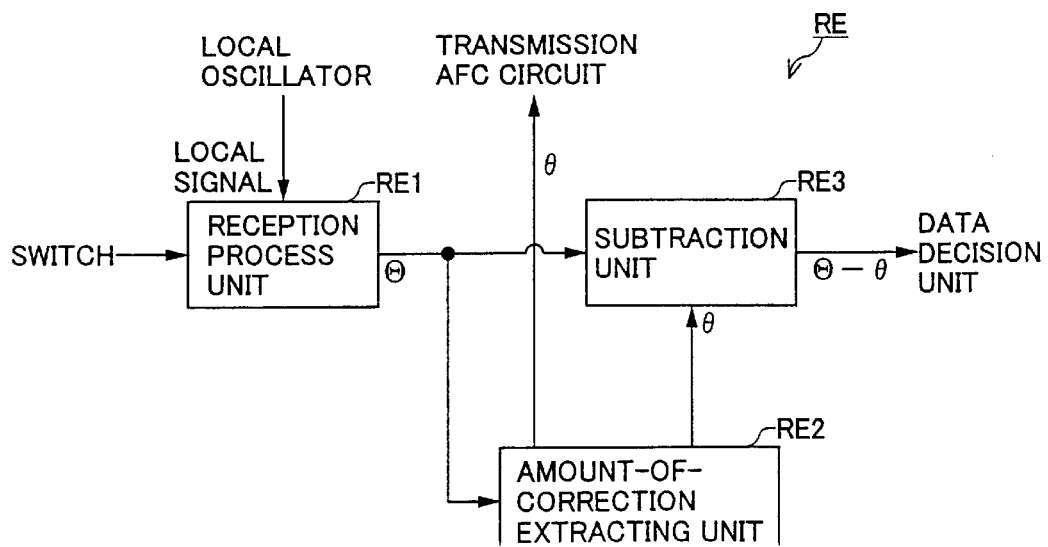
FIG. 2 is a block diagram of a reception AFC circuit according to a first embodiment of the present invention.

FIG. 2 is a block diagram of the reception AFC circuit RE shown in FIG. 1. The reception AFC circuit RE includes a reception process unit RE1, an amount-of-correction extracting unit RE2, and a subtraction unit RE3. The reception process unit RE1 receives the signal from the switch SW shown in FIG. 1 and the local signal from the local oscillator LO shown in FIG. 1. The amount-of-correction extracting unit RE2 receives an output of the reception process unit RE1, and supplies its output to the subtraction unit RE3 and the transmission AFC circuit TR shown in FIG. 1. The subtraction unit RE3 receives the output of the reception processing unit RE1 and the output of the amount-of-correction extracting unit RE2, and sends its output to the data decision unit DD shown in FIG. 1.

More particularly, the reception processing unit RE1 mixes a phase-modulated radio frequency signal received via the antenna AN with the local signal, and produces a resultant intermediate frequency signal. Then, the reception processing unit RE1 extracts phase information Θ from the intermediate frequency signal. The phase information Θ thus extracted is applied to the subtraction unit RE3 and the amount-of-correction extracting unit RE2.

Figure 4A:
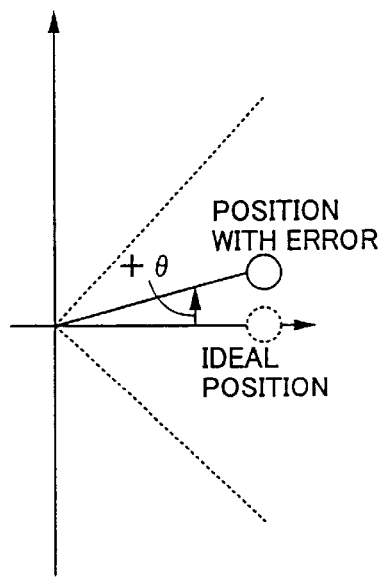
FIG. 4A is a graph of an error component (equal to an amount of correction) extracted by the reception AFC circuit.
Figure 4B:
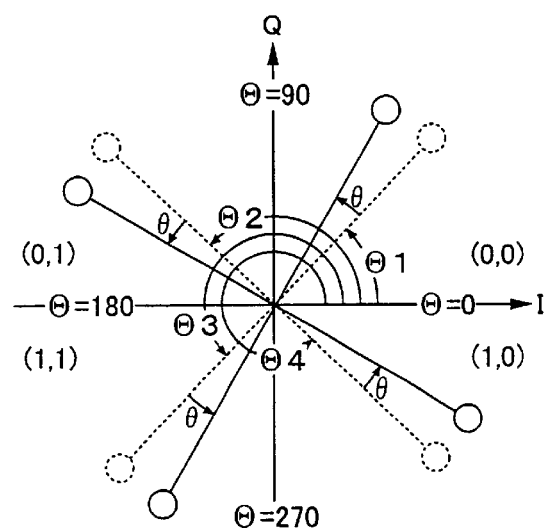
FIG. 4B is a graph illustrating what change on a signal constellation takes places by adding an amount of correction to transmission data.

As shown in FIG. 4B, the amount-of-correction extracting unit RE2 detects the amount θ of deviation (deviation angle) of input phase information (indicated by solid lines) with respect to the phases of ideal signal points indicated by broken lines. The amount θ of deviation is applied, as the amount θ of correction, to the subtraction unit RE3 and the transmission AFC circuit TR.

The subtraction unit RE3 subtracts the amount θ of correction from the phase information Θ. The result of this subtraction is corrected phase information that indicates the ideal signal point (the phase of the reference signal point). The corrected phase information is then applied to the data decision unit DD. The data decision unit DD makes a data decision using the corrected phase information.

Figure 3:
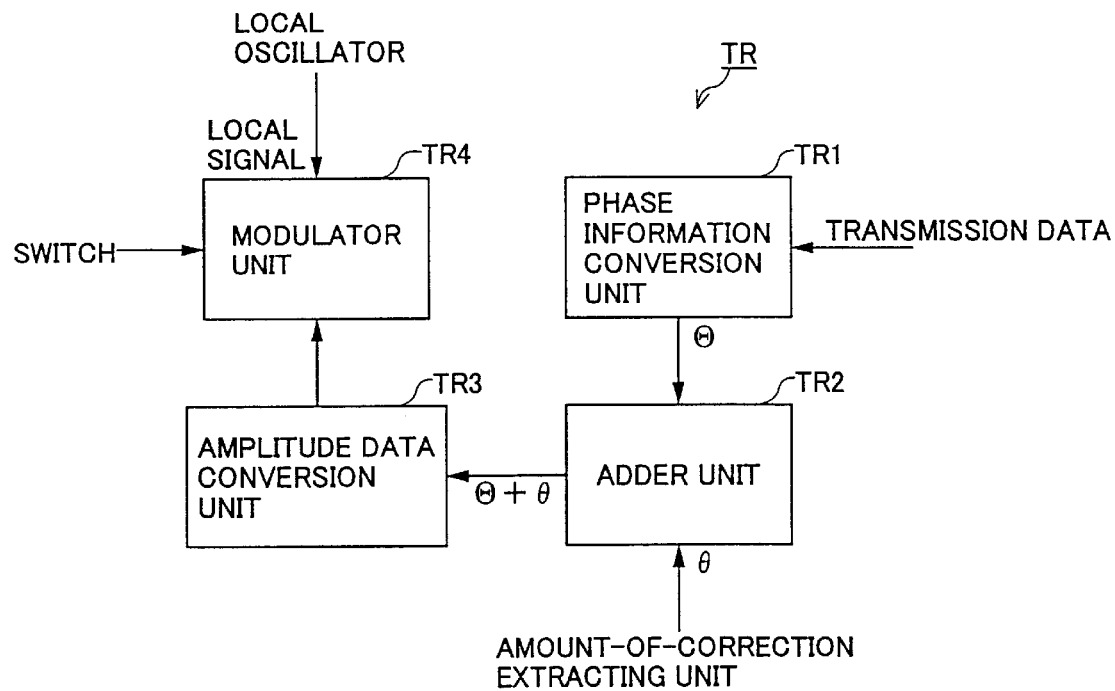
FIG. 3 is a block diagram of a transmission AFC circuit according to the first embodiment of the present invention.

FIG. 3 is a block diagram of the transmission AFC circuit TR. As shown, the transmission AFC circuit TR is made up of a phase information conversion unit TR1, an adder unit TR2, an amplitude data conversion unit TR3, and a modulator unit TR4.

FIGS. 4A and 4B are diagrams illustrating the principle of an operation of the transmission AFC circuit TR. More particularly, FIG. 4A shows a phase relationship between an ideal signal point (reference signal point) and the signal point of an actually received signal (the amount of deviation is equal to the amount θ of correction). FIG. 4B shows an example of phase mapping performed in the adder unit TR2.

The adder unit TR2 converts transmission data into that having any of phases Θ1–Θ4 indicated by the broken lines in FIG. 4B. The transmission data is addressed to a mobile station with which a communication takes place, and is, for example, voice data or image data. The adder TR2 adds the amount θ of correction from the amount-of-correction extracting unit RE2 of the reception AFC circuit unit RE and the phase of the input signal point. The amplitude data conversion unit TR3 converts the phase after addition into a combination of amplitude data (pieces of amplitude data of I and Q channels) corresponding to the signal point indicated by the phase after addition. The modulation unit TR4 modulates the local signal by using the combination of I-channel amplitude data and Q-channel amplitude data. For example, the frequency of the local signal is changed by using an analog signal obtained by a digital/analog conversion on the combination of I- and Q-channel data. The local signal thus modulated is sent to the antenna AN via the switch SW.

The amount θ of correction may be applied to the adder unit TR2 in such a manner that the average of a predetermined number of the amounts θ of corrections is calculated and applied thereto.

In the first embodiment of the present invention, preferably, synchronous detection using a conventional pilot signal or the like is performed. More particularly, due to a frequency difference of the carrier between the transmission and reception sides, the amount θ of correction may increase or decrease with time and may exceed π/4. In this case, the data decision unit DD may erroneously make a data decision on I-channel data/Q-channel data. Thus, by periodically transmitting the known pilot signal, the phase of the local signal is adjusted so that the reference axes of the I and Q channels coincide with each other between the transmission and reception sides.

The above-mentioned process is carried out by the transmission AFC circuit TR. Thus, it is possible to transmit the modulated wave in which the error component is relatively corrected with respect to the modulated signal received from the mobile station and to improve the quality of demodulated data independently of the performance of the mobile station. That is, the data demodulating operation in the mobile station is not affected at all, so that the mobile station is simplified.

Figure 5:
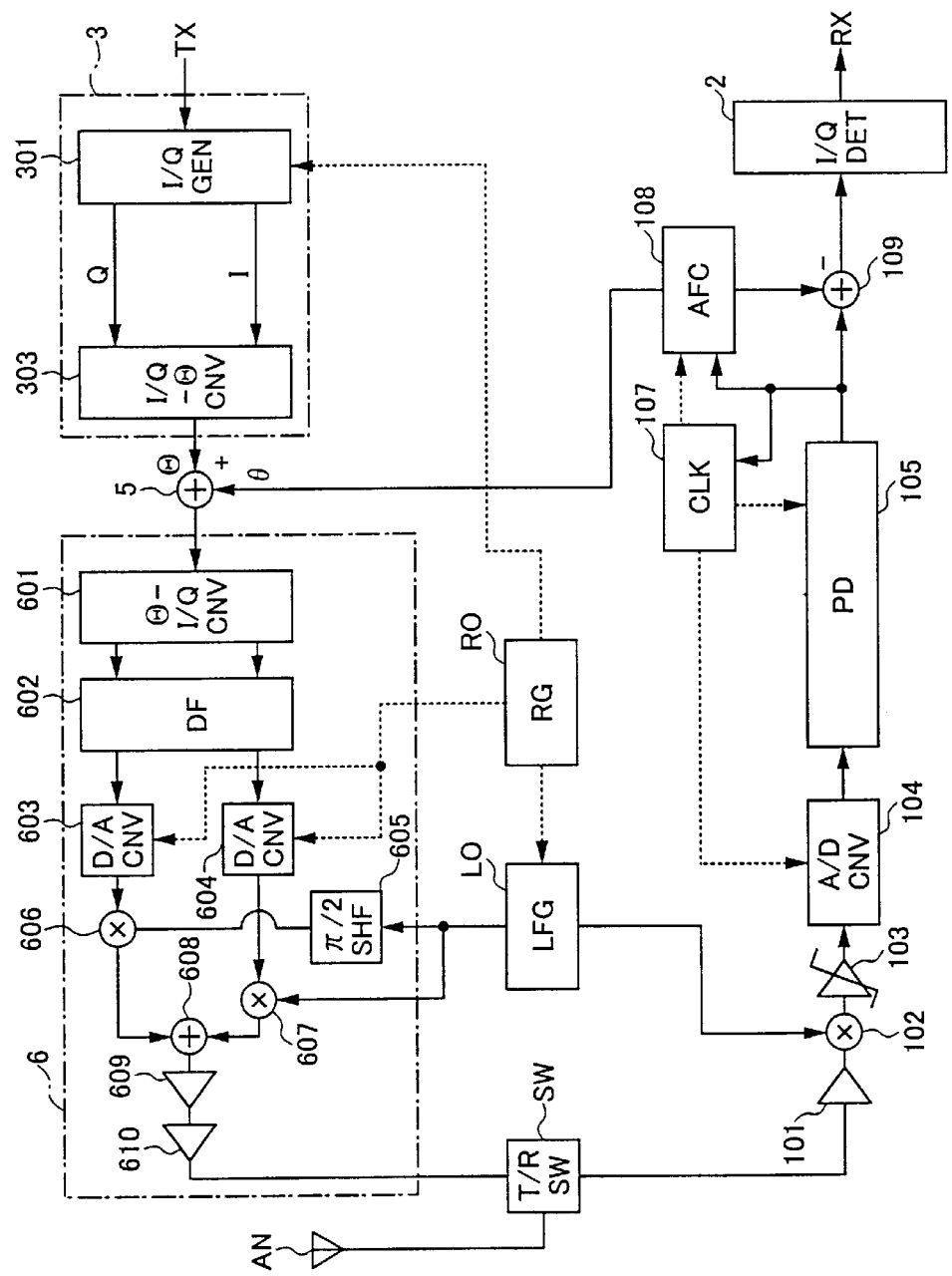
FIG. 5 is a block diagram of a configuration of a base station according to the first embodiment of the present invention.

A description will now be given of a radio communication method using the above-mentioned radio communication apparatus. The radio communication apparatus is configured as shown in FIG. 5. Here, the base station equipped with the radio communication apparatus is directed to a PHS (Personal Handyphone System) which employs a $\pi/4$-shift QPSK (Quadrature Phase Shift Keying) system. The configuration shown in the lower part of FIG. 5 corresponds to the reception AFC circuit RE shown in FIGS. 1 and 2.

More particularly, the reception AFC circuit includes an amplifier 101, a multiplier 102, a variable amplifier 103, an A/D (Analog-to-Digital) converter (A/D CONV) 104, a phase detector (PD) 105, a clock oscillator (CLK) 107, an AFC circuit 108, and an adder 109.

A received radio frequency signal from the antenna AN via the switch SW is amplified by the amplifier 101. The multiplier 102 mixes the amplified signal with a local signal, and supplies the resultant signal to the variable amplifier 103. Then, the variable amplifier 103 adjusts the received signal so as to be at a given level.

The A/D converter 104 samples the received signal by a clock supplied from the clock oscillator 107, so that the received signal is converted into a digital signal. The phase detector 105 detects phase information from the digitized signal. The clock oscillator 107 is supplied with the output of the phase detector 105, and supplies the A/D converter 104, the phase detector 105 and the AFC circuit 108 with the clock indicative of the operation timing. The AFC circuit 108 determines, as the amount of correction, the phase or frequency to be corrected at the time of transmission by referring to the phase information detected by the phase detector 105. The value obtained by subtracting the amount of correction from the phase information is supplied to an I/Q decision unit (I/Q DET) 2, which is an example of the data decision unit DD. The I/Q decision unit 2 makes a decision as to whether the received data is I-channel data or Q-channel data.

The part of the circuit shown in FIG. 5 corresponding to the transmission AFC circuit TR shown in FIGS. 1 and 3 operates as follows.

Serial transmission data TX to be transmitted to a mobile station is applied to a phase information conversion unit 3, which includes an I/Q data generating unit 301 and an I/Q-Θ conversion unit 303. The I/Q data generating unit 301 converts the serial transmission data TX into a pair of I-channel data and Q-channel data. The I/Q-Θ conversion unit 303 outputs phase information Θ concerning the signal point indicated by the pair of I-channel data and Q-channel data.

An adder 5 adds the phase information Θ output by the I/Q-Θ conversion unit 303 and the amount θ of correction (here, the amount of correction corresponding to the frequency error) output by the AFC circuit 108.

An amplitude data conversion unit 6 includes a Θ-I/Q conversion unit (Θ-I/Q CNV) 601, a digital filter unit (DF) 602, D/A converters (D/A CNV) 603 and 604, a $\pi/2$ phase shifter ($\pi/2$ SHF) 605, multipliers 606 and 607, an adder 608, and amplifiers 609 and 610.

The Θ-I/Q conversion unit 601 converts the phase information Θ from the adder 5 into amplitude data on the I and Q channels. The digital filter unit 602 subjects the amplitude data on the I and Q channels to a root Nyquist process. A configuration made up of the D/A converters 603 and 604, the $\pi/2$ phase shifter 605, the multipliers 606 and 607, the adder 608, and the amplifiers 609 and 610 modulates the amplitude data after the root Nyquist process by using the local signal, and outputs the resultant data to the switch SW. The modulated wave obtained by modulating the carrier wave by the transmission data is transmitted to the mobile station via the antenna AN.

According to the first embodiment of the present invention, the radio communication apparatus is capable of transmitting the modulated wave having a relatively small error from the base station to the mobile stations. Even if the mobile station has a relatively low frequency precision, the base station automatically reduces the frequency error in accordance with the frequency precision of the mobile station. Thus, the mobile stations can be produced at a reduced cost.

(Second Embodiment)

Figure 6:
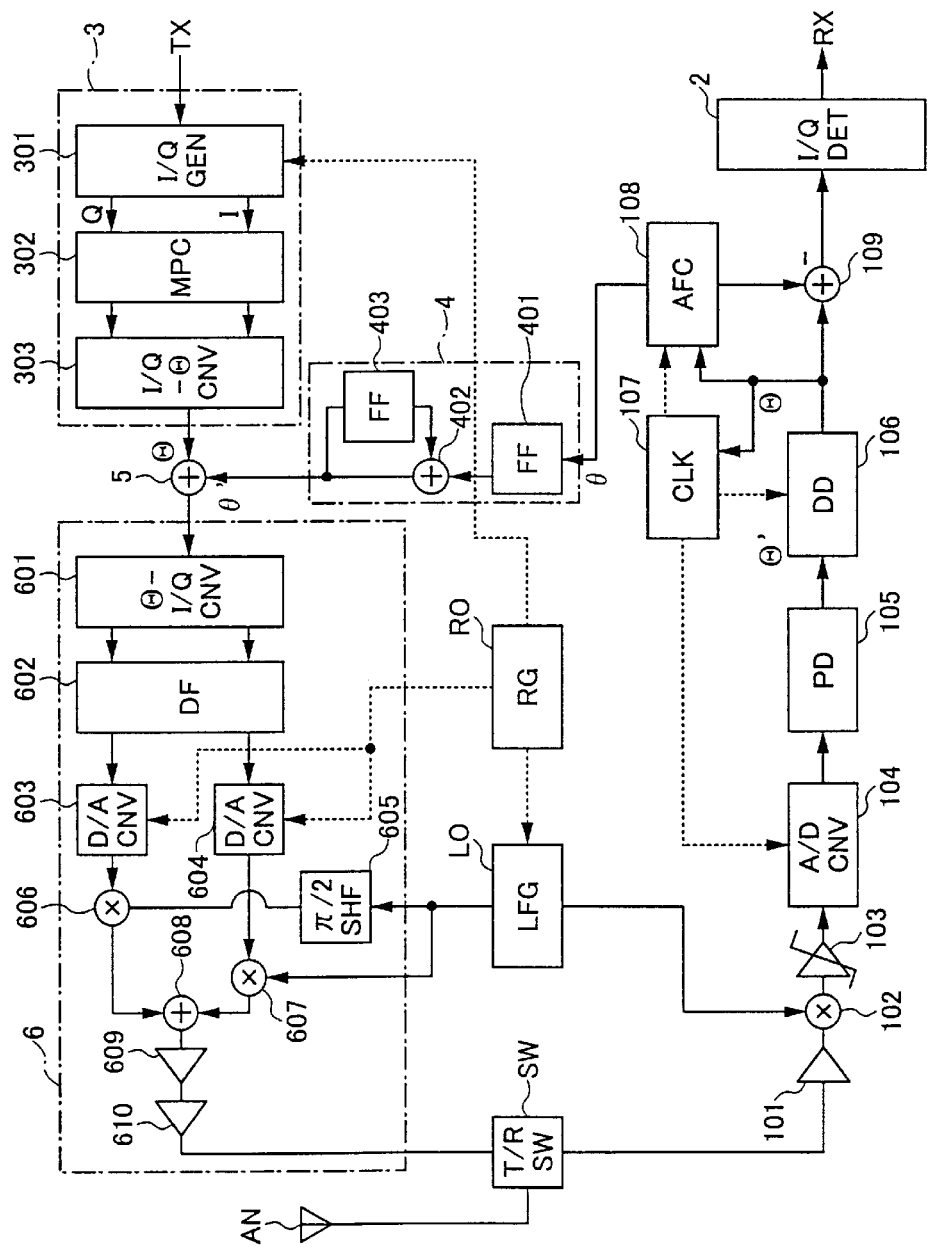
FIG. 6 is a block diagram of a configuration of a base station according to a second embodiment of the present invention.

FIG. 6 is a block diagram of a base station equipped with a radio communication apparatus for the personal digital cellulars (PDCs) employing the $\pi/4$-shift QPSK system according to a second embodiment of the present invention. Here, a description will be given of a case where the radio communication apparatus receives a signal obtained by differential encoding in the mobile station. Any part shown in FIG. 5 that is the same as a part shown in FIG. FIG. 6 is denoted by the same reference numeral in both figures, and a description thereof will be omitted here.

The reception AFC circuit of the base station shown in FIG. 6 includes the amplifier 101, the multiplier 102, the variable amplifier 103, the A/D converter 104, the phase detector 105, a delay detection (DD) unit 106, the clock oscillator 107, the AFC circuit 108, and the adder 109. The configuration shown in FIG. 6 differs from that shown in FIG. 5 in that the phase detection unit 105 is followed by the delay detection unit 106, which is supplied with the clock from the clock oscillator 107.

The phase detection unit 105 detects a phase component Θ' from the received signal after the digitizing process. The delay detection unit 106 delay-detects the received signal, so that the phase component Θ' is converted into the amount Θ of phase shifting (a kind of phase information), which is then supplied to the clock oscillator 107.

The AFC circuit 108 subtracts the phase of the reference point in each quadrant ($-\pi/4$, $\pi/4$, $3\pi/4$, $-\pi/4$) from the amount Θ of phase shifting, and determines one of the four results which has the minimum absolute value. The determined subtracted value is the amount of correction θ (Θ—reference amount of phase shifting), which is supplied to the I/Q decision unit 2. The remaining components are the same as those of the reception AFC circuit shown in FIG. 5.

An integration process unit 4 is provided between the reception AFC circuit and the transmission AFC circuit in the second embodiment of the present invention. The integration process unit 4 temporarily stores the amount θ of correction in a built-in register in which an integrated amount θ of correction is stored. The adder 5 adds the integrated amount θ of correction to the modulation data to be transmitted at the transmission timing (transmission slot). The adder 4 includes a flip-flop (FF) 401, an adder 402 and a flip-flop (FF) 403.

The flip-flop 401 temporarily stores the amount θ of correction from the AFC circuit 108, and outputs it to the adder 402 at the time of transmission. The adder 402 adds the amount θ of correction from the flip-flop 401 and the output of the flip-flop 403 which feeds the output of the adder 402 back thereto. Thus, the integrated amount θ' of correction is obtained and applied to the adder 5.

The transmission AFC circuit of the radio communication apparatus shown in FIG. 6 is slightly different from that used in the first embodiment of the present invention shown in FIG. 5. More particularly, a mapping circuit (MPC) 302 is interposed between the I/Q data generating unit 301 and the I/Q-Θ conversion unit 303.

The mapping circuit 302 performs differential encoding using the I-channel data and Q-channel data converted by the I/Q data generating unit 301, and outputs corresponding amplitude data. More particularly, the mapping circuit 302 outputs a pair of amplitude data represented by the following expressions by using angles φ(−3π/4, 3π/4, π/4, −π/4) corresponding to the pairs (I, Q) of I-channel and Q-channel parallel data generated by the I/Q data generating unit 301 and the amplitudes $I_{-1}$, $Q_{-1}$ corresponding to the previously output signal point:

$$X = I_{-1} \cos(\phi) - Q_{-1} \sin(\phi)$$

$$Y = I_{-1} \cos(\phi) + Q_{-1} \sin(\phi).$$

The I/Q-Θ conversion unit 303 outputs the phase information Θ (=$\tan^{-1}(Y/X)$) of the signal point indicated by the amplitude data.

The phase information Θ is added to the integrated amount θ' of correction by the adder 5, so that it reflects the error component of the frequency included in the received signal. Then, the output of the adder 5 is applied to the Θ-I/Q conversion unit 601. The unit 601 converts the phase information Θ into I-channel and Q-channel amplitude data (a pair of data) The digital filter unit 602 subjects the amplitude data of I and Q channels after the conversion to a root Nyquist process. The configuration made up of the D/A converters 603 and 604, the π/2 phase shifter 605, the multipliers 606 and 607, the adder 608, and the amplifiers 609 and 610 modulates the amplitude data after the root Nyquist process by using the local signal, and outputs the resultant data to the switch SW. The modulated wave obtained by modulating the carrier wave by the transmission data is transmitted to the mobile station via the antenna AN.

The configuration according to the second embodiment of the present invention can be applied to a system equipped with differential encoding.

(Third Embodiment)

In the above-mentioned first and second embodiments of the present invention, the phase information is added by the adder 5 of the transmission AFC circuit. Alternatively, the above adding process can be handled as amplitude data. The third embodiment of the present invention is directed to the above alternative. The following description of the third embodiment is directed to a transmission AFC circuit, and a description of up to the process for obtaining the amount of correction or the integrated amount of correction will be omitted because it is the same as that in the first and second embodiments of the present invention.

Figure 7:
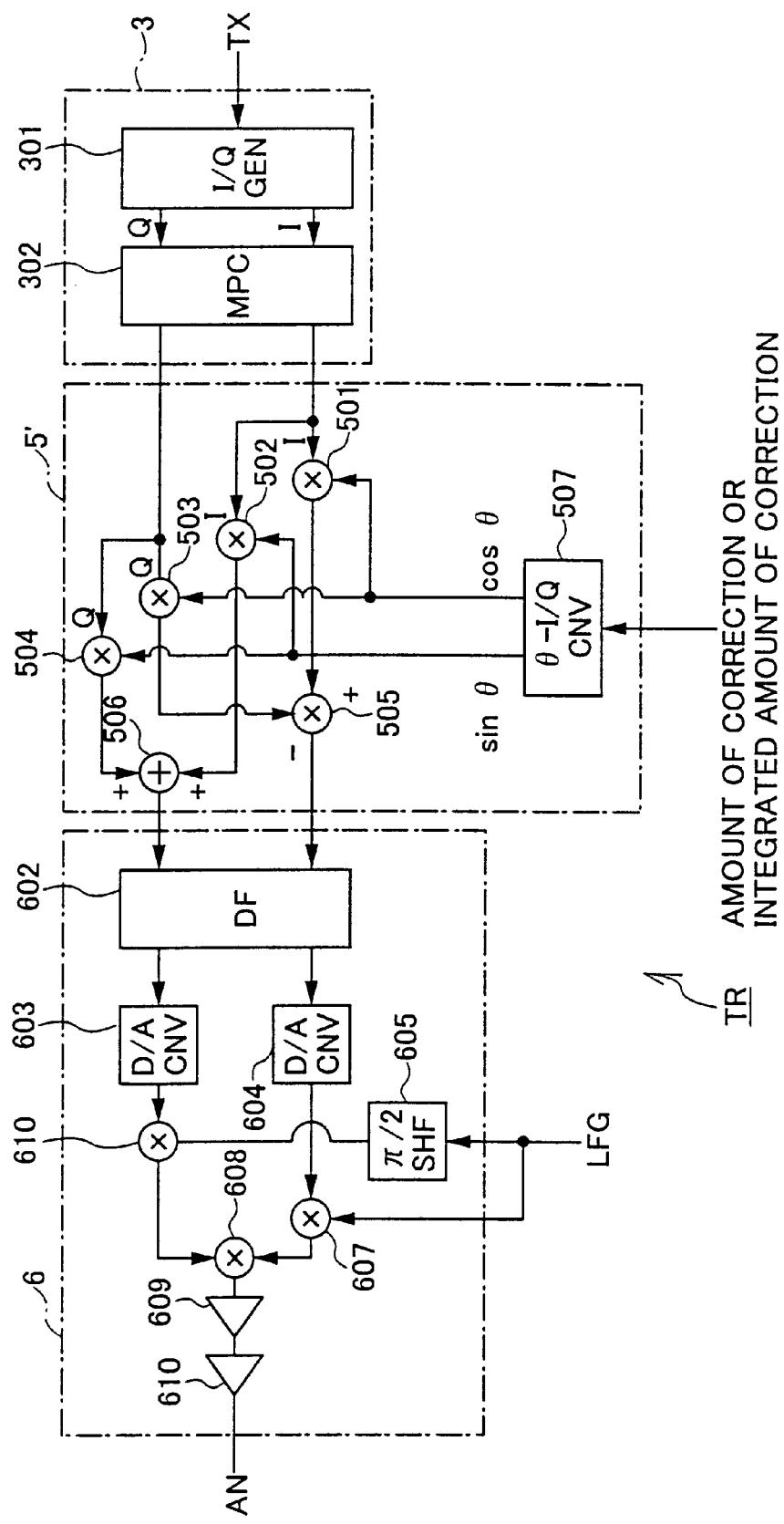
FIG. 7 is a block diagram of a configuration of a base station according to a third embodiment of the present invention.

FIG. 7 is a block diagram of a transmission AFC circuit employed in the radio communication apparatus according to the third embodiment of the present invention. Any part shown in the previous figures that is the same as a part shown in FIG. 7 is denoted by the same reference numeral in these figures.

Since the add process is performed as amplitude data, the transmission AFC circuit does not need the I/Q-Θ conversion unit 303 and the Θ-I/Q conversion unit 601, while it needs a correction unit 5' having a different configuration from that of the adder 5.

The correction unit 5' includes four multipliers 501–504, two adders 505 and 506, and a θ-I/Q conversion unit (θ-I/Q CNV) 507. The θ-I/Q conversion unit 507 converts the amount θ of correction (first embodiment) or the integrated amount θ of correction (second embodiment) from the reception AFC circuit (not shown in FIG. 7 for the sake of simplicity) into amplitude data (sin θ, cos θ, sin θ', cos θ').

The correction 5' performs a multiplying operation on all the combinations of the amplitude data from the I/Q data generating unit 301 (mapping circuit 302) and the amplitude data from the θ-I/Q conversion unit 507 by means of the built-in multipliers 501–504. More particularly, the I-channel data from the I/Q data generating circuit 301 (mapping circuit 302) is applied to the multipliers 501 and 502, and Q-channel data is applied to the multipliers 503 and 504. The multipliers 501 and 503 are supplied with cos θ from the θ-I/Q conversion unit 507, and multiply the I-channel and Q-channel data by cos θ, respectively. The multipliers 502 and 504 are supplied with sin θ from the θ-I/Q conversion unit 507, and multiply the I-channel and Q-channel data by sin θ, respectively.

The adder 505 subtracts the output data Qcos θ of the multiplier 503 from the output data Icos θ from the multiplier 501, and outputs Icos θ−Qcos θ. The adder 506 adds the output data Isin θ of the multiplier 502 and the output data Qsin θ from the multiplier 504, and outputs Isin θ+Q sin θ. Thus, it is possible to obtain the combination of amplitude data corresponding to the phase that is the sum of the phase of the signal point indicated by the pair of I-channel and Q-channel amplitude data from the I/Q data generating unit 301 (mapping circuit 302) and the amount of correction (or the integrated amount of correction). Therefore, it is possible to realize the same process as that of the first or second embodiment of the present invention in which the I-channel and Q-channel data are converted into the phase information, which is then subjected to the add process.

The output data of the adders 505 and 506 are applied to the digital filter 602, and the modulation process is then performed in the same manner as has been described previously.

(Fourth Embodiment)

Figure 8:
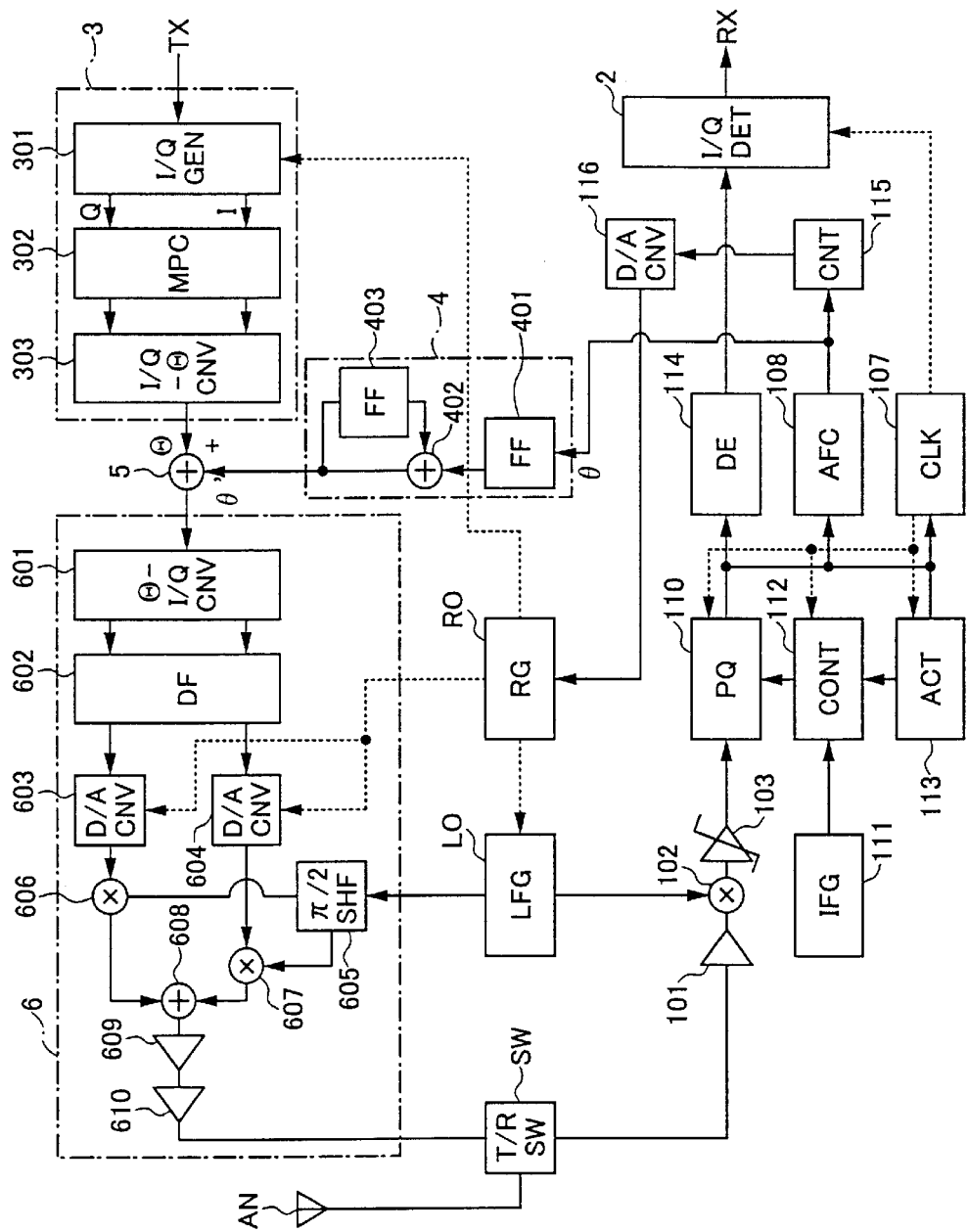
FIG. 8 is a block diagram of a base station according to a fourth embodiment of the present invention.

FIG. 8 is a block diagram of a base station equipped with a radio communication apparatus adapted to the personal digital cellular system according to a fourth embodiment of the present invention. In FIG. 8, parts that are the same as those shown in the previously described figures are given the same reference numerals.

The reception AFC circuit shown in FIG. 8 includes the amplifier 101, the multiplier 102, the variable amplifier 103, the clock oscillator 107, the AFC circuit 108, a phase quantization circuit (PQ) 110, an intermediate frequency generator (IFG) 111, a phase/frequency control unit (CONT) 112, an adaptive carrier synchronization circuit (ACT) 113, a differential encoding unit (DE) 114, a counter (CNT) 115, and a D/A converter (D/A CNV) 116.

The fourth embodiment of the present invention is the same as the first through third embodiments thereof with regard to up to the process for converting the received signal into the IF signal. The fourth embodiment of the present invention employs the ACT-type synchronous detection system as the decoding method, and has unique circuit parts and operations thereof associated with this type of synchronous detection system. The ACT type synchronous detection system can be defined as a detection system in which the IF signal obtained from the received radio frequency signal is made to follow the phase of the IF signal detected one symbol earlier.

The IF generator 111 generates the above-mentioned IF signal, the phase of which is controlled by the phase/frequency control unit 112 in accordance with an instruction from the ACT circuit 113. The phase quantization circuit 110 extracts the phase information $\Theta$ from the received signal by using the IF signal. The phase information $\Theta$ is subjected to differential decoding by the differential decoding unit 114. The amount $\Delta\Theta$ of phase shifting thus extracted is applied to the I/Q decision unit 2.

In the embodiment of the present invention of interest, the integrated amount $\theta'$ of correction is sent to the adder 5 of the transmission AFC circuit. The amount $\theta'$ of correction may be calculated as follows.

The AFC circuit 108 calculates the amount $\theta$ of correction [$\Theta$—(the phase of the reference signal point)] from the phase information $\Theta$ output by the phase quantization circuit 110. The amount $\theta$ of correction thus obtained is sent to the integration process unit 4. The integration process unit 4 operates in the same manner as the second embodiment of the present invention which has been described previously. That is, the amount $\theta$ of correction is temporarily stored in the register, so that the integrated amount $\theta'$ of correction can be obtained. The correcting operation on the frequency error based on the integrated amount $\theta'$ of correction is the same as that employed in the second embodiment of the present invention.

(Fifth Embodiment)

Figure 9:
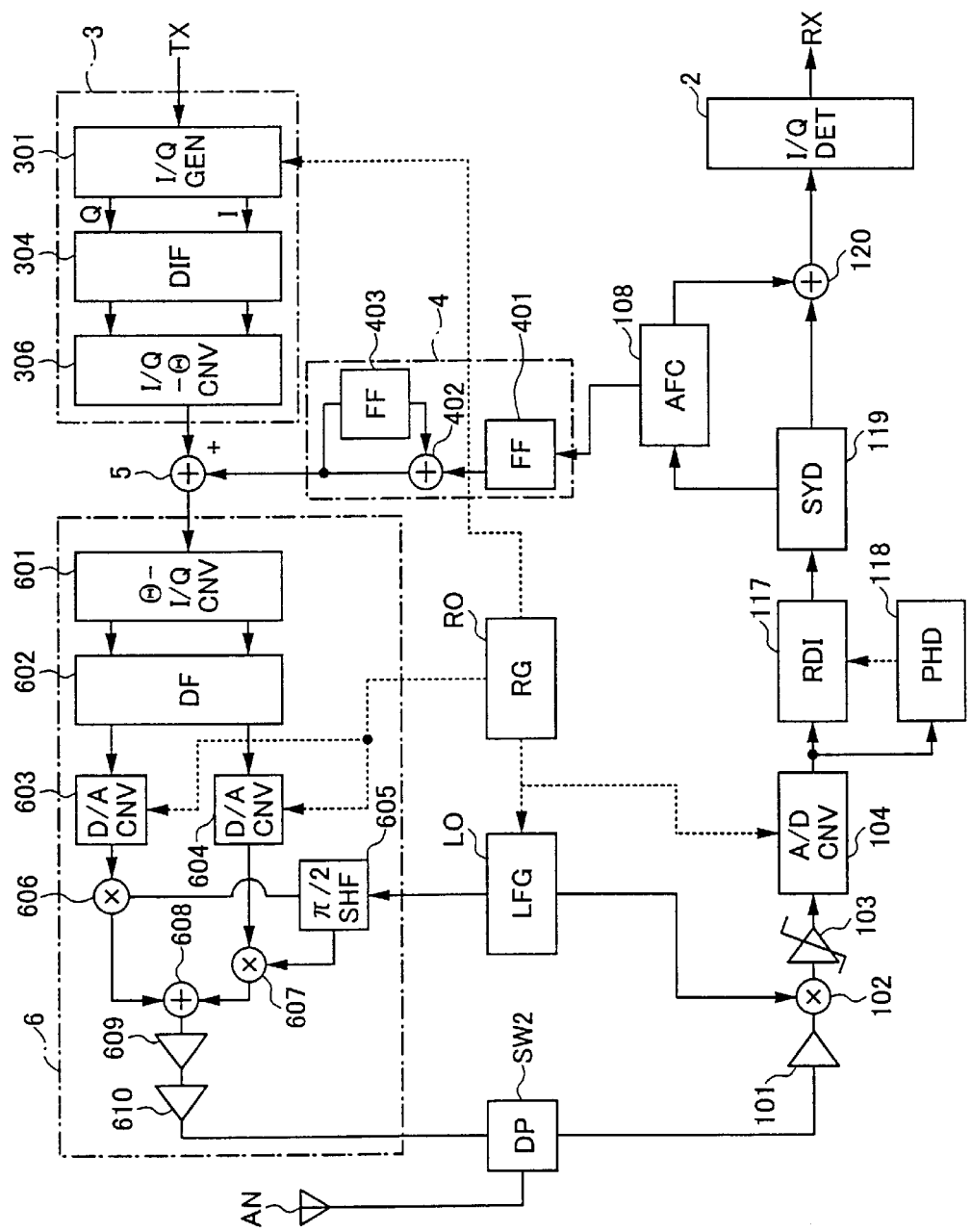
FIG. 9 is a block diagram of a base station according to a fifth embodiment of the present invention.

FIG. 9 is a block diagram of a base station to which a CDMA (Code Division Multiple Accessing) system is applied. In FIG. 9, parts that are the same as those shown in FIGS. 6 and 8 are given the same reference numbers.

The phase information conversion unit 3 is made up of the I/Q data generating unit 301, a diffusion or spreading unit 304, and an I/Q-$\Theta$ conversion unit (I/Q-$\Theta$ CNV) 306. Transmission data which have been converted into I-channel and Q-channel data (a pair of amplitude data) by the I/Q data generating unit 301 is spread by a spreading code having a higher bit rate than that of the transmission rate. The spread I-channel data and Q-channel data are mapped on the phase states of the constellation for each of the possible spreading rates (chip rates) by the QPSK modulation, Then, the data is converted into phase information $\Theta$, which is then supplied to the adder 5.

The reception AFC circuit includes the amplifier 101, the multiplier 102, the variable amplifier 103, the A/D (Analog-to-Digital) converter (A/D CONV) 104, a despreading unit (reverse diffusion) (RDI) 117, a path detection unit (PHD) 118, a synchronous-detection-based phase detecting unit (SYD) 119, the AFC circuit 108, and an adder 120.

The despreading unit 117 despreads the received signal which has been subjected to the IF conversion and digitized by the A/D converter 104 by using a spreading code from the path detection unit 118. The despread received signal is subjected to a pilot synchronous detection process by the synchronous detection based phase detecting unit 119. The phase information $\Theta$ (modulated phase data) thus obtained is supplied to the I/Q decision unit 2.

The pilot synchronous detection is defined as a synchronous detection process which detects, in a unit of a pilot block, the phase difference $\Delta\Theta$ axis between the phase of the received carrier wave and the phase of the reference point, and corrects a multiplexed signal.

The process for correcting the frequency error according to the present embodiment is performed as follows.

The difference between the phase difference $\Delta\Theta$ axis n of an arbitrary pilot block obtained by the synchronous detection based phase detecting unit 119 and the phase difference $\Delta\Theta$ axis n−1 that is one pilot block earlier corresponds to a phase deviation (deviation angle) per pilot block due to the frequency error caused between the other party mobile station and the base station of interest. The frequency error per symbol is obtained from $\Delta\Theta$ axis n−$\Delta\Theta$ axis n−1, and is added (or subtracted) by the adder 120. In this manner, the frequency error is corrected. The frequency error is converted into the amount $\theta$ of correction, which is supplied to the integration process unit 4. The correction process for the transmission frequency error in the integration process unit 4 and the transmission AFC circuit is almost the same as that of the second embodiment of the present invention.

(Sixth Embodiment)

The present invention can be applied to a base station (or a mobile station) to which a time division multiplexing transmission system is applied. The base station is equipped with a slot management unit, which manages the add process with respect to transmission data for every slot.

Figure 10:
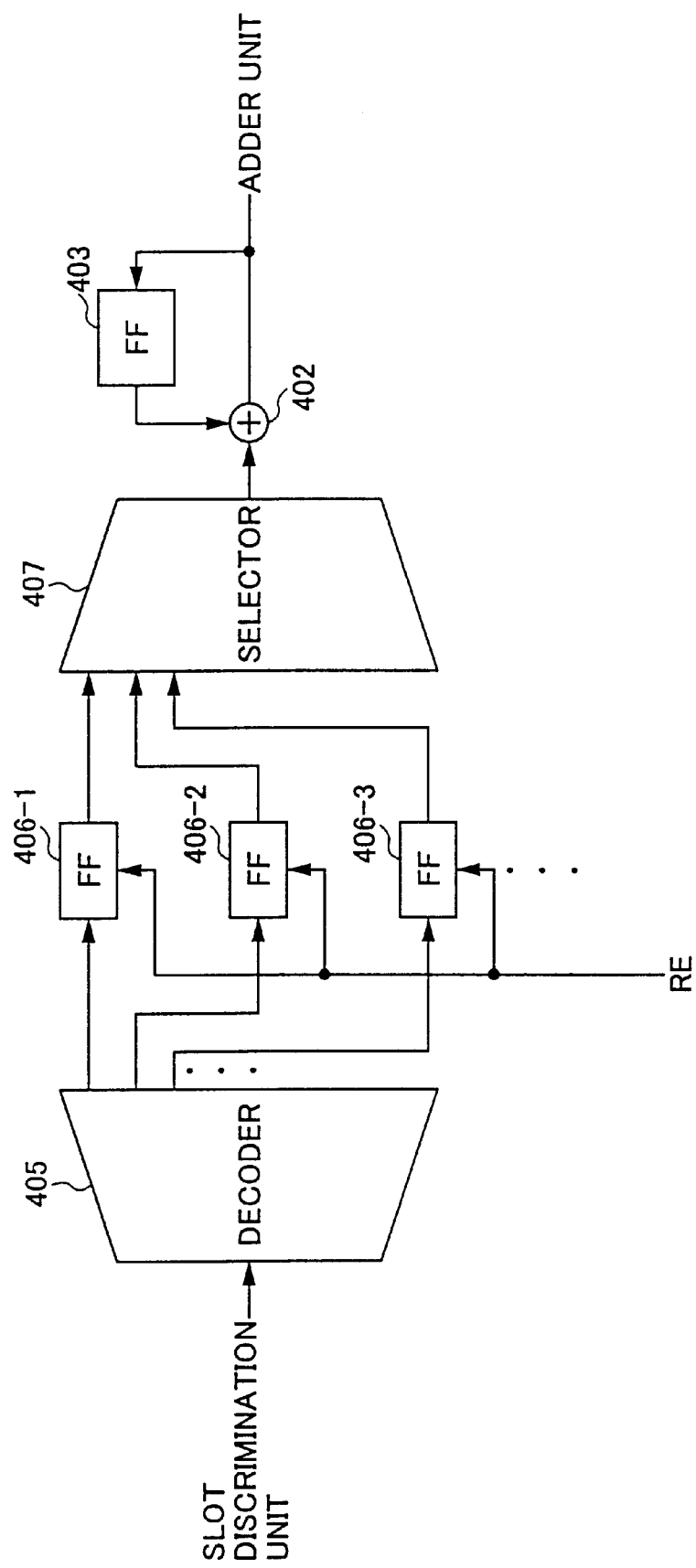
FIG. 10 is a block diagram of a base station according to a sixth embodiment of the present invention.

FIG. 10 is a block diagram of a configuration equipped with the slot management unit in the base station. The slot management unit is implemented by the adder 402, the flip-flop 403, a decoder 405, flip-flops 406-1 through 406-n, a selector 407, and a slot discrimination unit (not shown for the sake of simplicity). When there is no need to discriminate one of the flip-flops 406-1 through 406-n from another, the suffix thereof will be omitted.

The flip-flops 406 are supplied with the amount $\theta$ of correction (or the integrated amount $\theta'$ of correction) with respect to the error component contained in the received signal from the reception AFC circuit. The flip-flops 406 are provided for the respective slots to be managed. In FIG. 10, n slots are managed.

The decoder 405 is supplied with a slot discrimination signal from the slot discrimination unit. The decoder 405 decodes the slot discrimination signal, and sends an enable signal to one of the flip-flops 406 that corresponds to the specified slot. The flip-flop 406 that receives the enable signal temporarily stores the amount $\theta$ of correction (or the integrated amount $\theta'$ of correction).

The slot discrimination signal is also sent to the selector 407, which selects one of the flip-flops 406 that corresponds to the specified slot. The amount $\theta$ of correction (or the integrated amount $\theta'$ of correction) stored in the selected flip-flop 406 is applied to the adder 402. The output data of the adder 402 is supplied to the adder 5 of the transmission AFC circuit.

The operation of the circuit following the adder is the same as that which has been described with reference to FIGS. 5 through 9.

According to the sixth embodiment of the present invention, the amount of correction for the frequency error component contained in the received signal is managed for each of the slots in the base station. Thus, it is possible to reduce the load applied on the reception AFC circuit particularly in a situation in which various types of mobile stations are working. In addition, the sixth embodiment of the present invention is attractive in light of the production cost because the amounts $\theta$ of correction are stored in the flip-flops 406 and there is no need to use oscillators such as VC-TCXO for the respective slots.

(Seventh Embodiment)

In a case where a symbol-based communication takes place using a plurality of slots, the frequency error component contained in the received signal is extracted for every signal timing (symbol timing). Thus, there is a possibility that the error component greatly changes over symbols. The seventh embodiment of the present invention takes into account the above, and intends to suppress the error component or an extreme dispersion of the amount of correction based thereon and operate the transmission in a stable state at a high precision.

According to the seventh embodiment of the present invention, a process for smoothing the frequency error component is performed for every reception timing (received slot), and the amount of correction based on the average of the frequency components over slots is determined.

Figure 11:
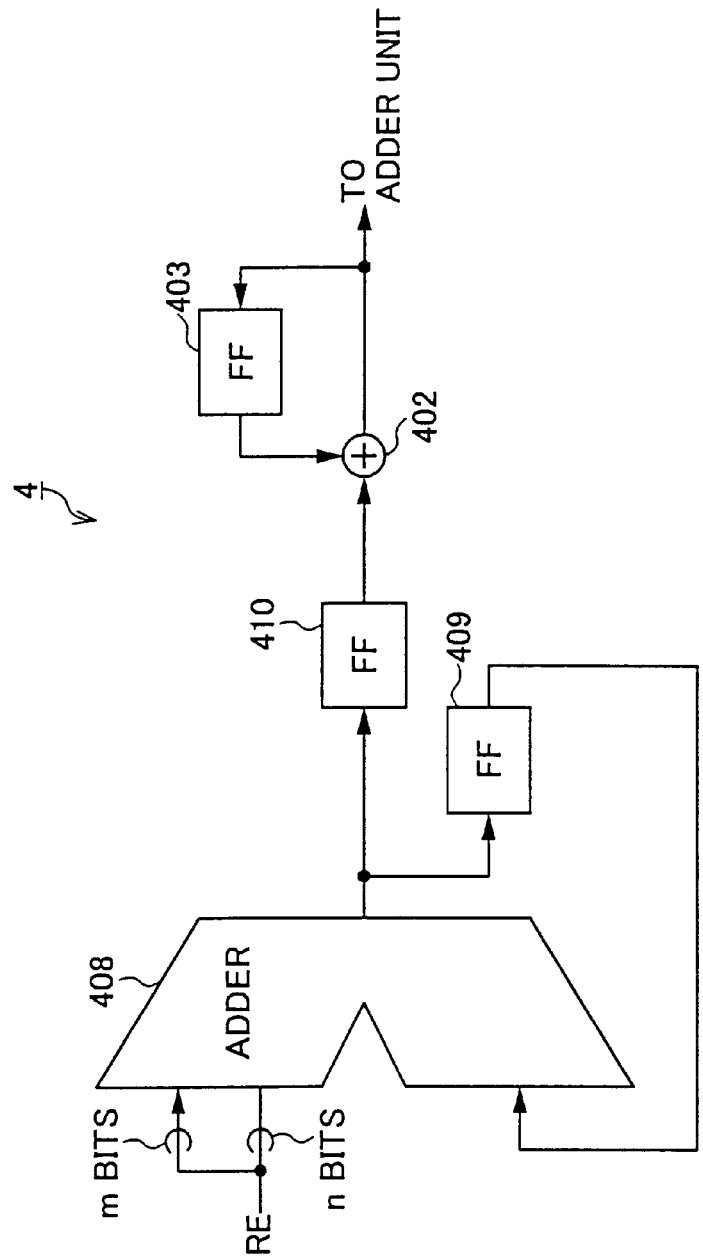
FIG. 11 is a block diagram of a base station according to a seventh embodiment of the present invention.

FIG. 11 is a block diagram of a unit for determining the amount of correction determined by the above-mentioned manner. The amount-of-correction determining unit shown in FIG. 11 is made up of adders 402 and 408, and flip-flops 403, 409 and 410. When the error signal contained in the received signal is angular information (sin/cos), an integration process over an arbitrary section of 2 m symbols is carried out by the adder 408 and the flip-flop 409 in a single received slot section. When the error component is described by n bits, the adder 408 is supplied with (m+n) bits obtained by a bit extension process in which the value of the most significant bit (MSB) is increased by m bits, which are positioned as upper bits to be added to the n bits. The (m+n) bits thus obtained are added to the error component (m+n) that is one symbol earlier. The integration process is implemented by continuously performing the above-mentioned process over the 2 m-symbol section.

After the integration over 2 m symbols, the final value is stored in the flip-flop 410 of the following stage. The m lower bits are discarded, and the n upper bits are used, so that a magnification of 1/2 m is realized and used at the time of transmission. Thus, it is possible to realize a transmission AFC process that uses the average over the 2 m-symbol section and the intra-slot smoothed error.

(Eighth Embodiment)

An eighth embodiment of the present invention employs a channel management unit installed in a base station to which the CDMA system is applied, whereby the process of adding the amount of correction with respect to the carrier wave for transmission is managed for every channel code.

Figure 12:
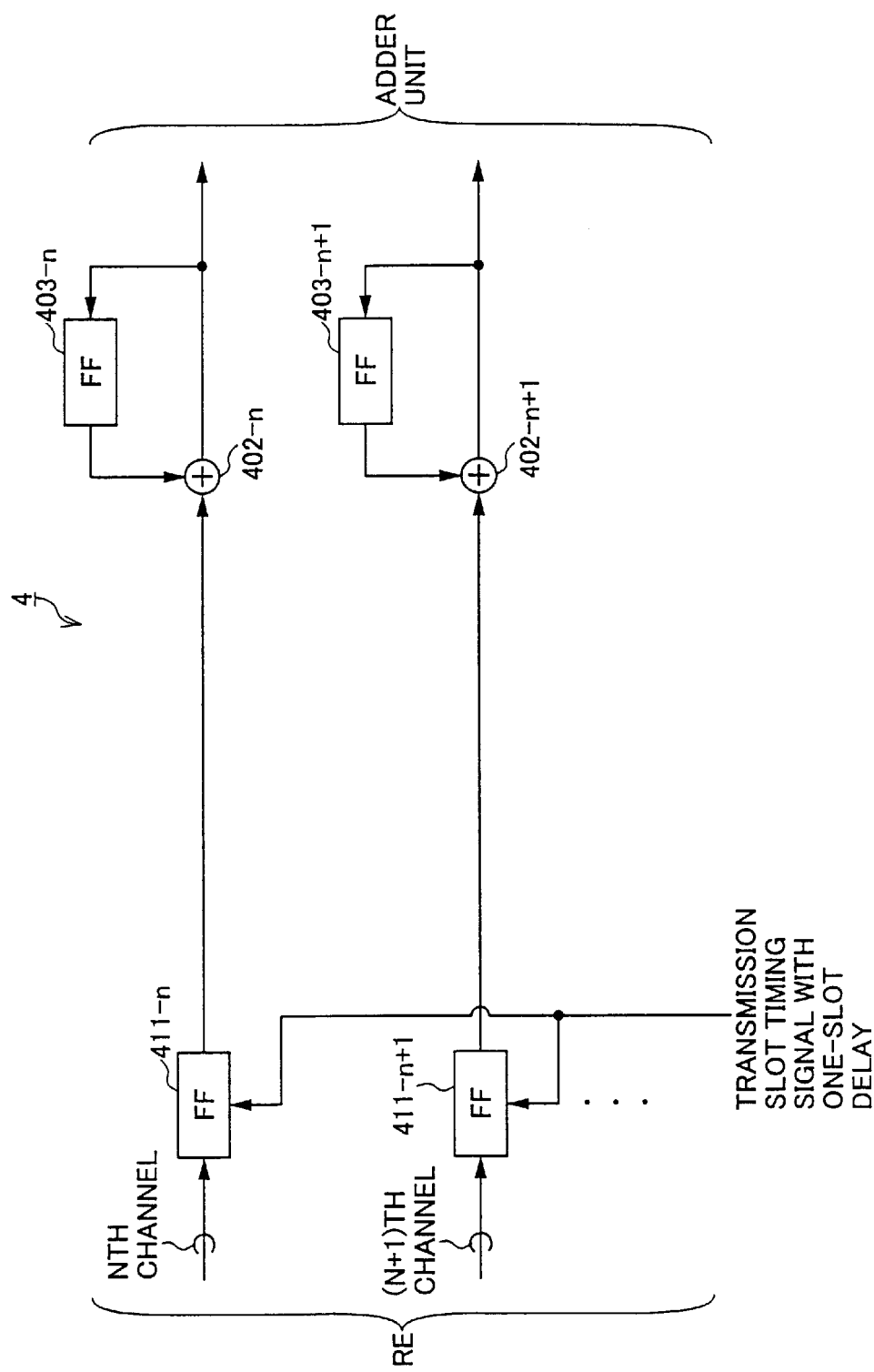
FIG. 12 is a block diagram of a base station according to an eighth embodiment of the present invention.

FIG. 12 is a block diagram of a configuration of the channel management unit employed in the eighth embodiment of the present invention. The channel management unit is made up of flips-flops 403-n, 403-n+1, 411-n, 411-n+1, . . . , and adders 402-n, 402-n+1, . . . . In the following description, the suffix of each reference numeral is omitted.

As is well known, the CDMA system spreads one carrier wave by different spreading or channel codes. Each of the flip-flops 411 stores, for the respective channel (code), the difference between the phase difference $\Delta\Theta$ axis n of an arbitrary pilot block obtained by the synchronous detection based phase detecting unit 119 and the phase difference $\Delta\Theta$ axis n-1 that is one pilot block earlier. The above phase difference corresponds to the amount of correction per pilot block due to the frequency error between the mobile station and the base station.

For each channel code transmitted with a delay within one slot, the outputs of the flip-flops 403 are fed back and added to the phase information concerning the transmission data by the adders 402 in the unit of symbol.

That is, the circuit made up of one flip-flop 411, one flip-flop 403 and one adder 402 is provided for each of the channels. Thus, the code-based management can be realized by the present invention applied to the CDMA system.

The reception AFC circuit used in the eighth embodiment of the present invention differs from that used in each of the first through seventh embodiments of the present invention. That is, the eighth embodiment of the present invention does not employ the amount of correction based on the frequency error component contained in the received signal but the error component obtained by the synchronous detection based phase detection unit, namely, ($\Delta\Theta$ axis n)–($\Delta\Theta$ axis n–1).

(Ninth Embodiment)

A ninth embodiment of the present invention corresponds to a modification of the eighth embodiment thereof. In the eighth embodiment of the present invention, the amount of correction is constantly added to transmission data with the one-slot delay. In contrast, the ninth embodiment of the present invention integrates the amount of correction in the symbol unit and adds the integrated amount of correction to transmission data.

Figure 13:
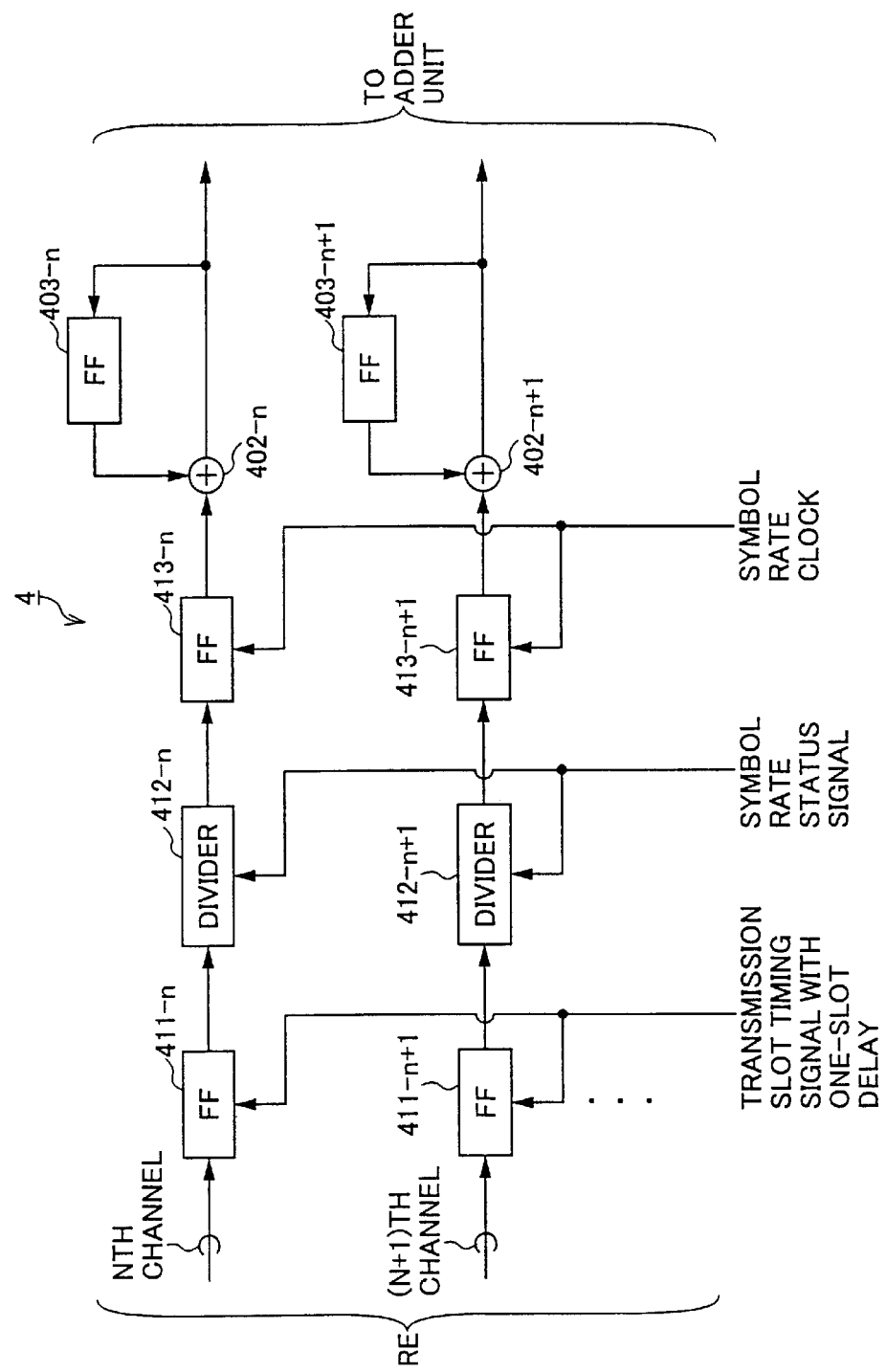
FIG. 13 is a block diagram of a base station according to a ninth embodiment of the present invention.

FIG. 13 is a block diagram of a channel management unit used in the ninth embodiment of the present invention. The channel management unit is made up of flip-flops 403-n, 403-n+1, . . . , 4110n, 411-n+1, . . . , 413-n, 413-n+1, . . . , dividers 412-n, 412-n+1, . . . , and adders 402-n, 402-n+1, . . . . In the following description, the suffix of each reference numeral is omitted.

The phase components of ($\Delta\Theta$ axis n)–($\Delta\Theta$ axis n–1) are stored in the flip-flops 411, and are supplied to the dividers 412 in response to transmission timing signals with a one-slot delay. The dividers 412 divide the phase components of ($\Delta\Theta$ axis n)–($\Delta\Theta$ axis n–1) by the number of symbols per pilot block. The unit for division can be selected by a symbol rate status signal indicating the symbol rate to be transmitted. The amounts of correction in a symbol unit are integrated by the flip-flops 403 and 413 and the adders 402 in the symbol unit and are added to the transmission data. That is, the circuit made up of one flip-flop 411, one flip-flop 403, one flip-flop 413, one divider 412, and one adder 402 is provided for each of the channels.

The present invention is not limited to the specifically disclosed embodiments, and variations and modifications may be made without departing from the scope of the present invention.

The present application is based on Japanese priority application no. 2000-086702 filed on Mar. 27, 2000, the entire contents of which are hereby incorporated by reference.

What is claimed is:

1. A radio communication apparatus in which a received signal is demodulated using an output signal of a local oscillator, and the output signal of the local oscillator is modulated by modulating signal including transmission information and is then transmitted, said radio communication apparatus comprising:

a first unit detecting a frequency difference between the received signal and the output signal of the local oscillator;

a second unit determining an amount of correction based on the frequency difference detected by the first unit; and a third unit applying the amount of correction determined by the second unit to the modulating signal by rotating a signal point of the modulating signal on the complex plane.

2. A radio communication method in which a received signal is demodulated using an output signal of a local oscillator, and the output signal of the local oscillator is modulated by a modulating signal including transmission information and is then transmitted, said radio communication method comprising the steps of:

(a) detecting a frequency difference between the received signal and the output signal of the local oscillator;

(b) determining an amount of correction based on the frequency difference detected by the step (a); and (c) applying the amount of correction determined by the step (b) to the modulating signal by rotating a signal point of the modulating signal.

3. A radio communication method in which a received signal is demodulated using an output signal of a local oscillator, and the output signal of the local oscillator is modulated by a modulating signal including transmission information and is then transmitted, said radio communication method comprising the steps of:

(a) detecting a frequency difference between the received signal and the output signal of the local oscillator;

(b) determining an amount of correction based on the frequency difference detected by the step (a);

(c) storing the amount of correction for every information unit; and (d) applying, to the modulation signal of a desired information unit, the amount of correction corresponding to said desired information unit by rotating a signal point of the modulating signal on the complex plane.

4. A radio communication apparatus comprising:

a first unit receiving a phase-modulated signal;

a second unit extracting phase information from the phase-modulated signal received by the first unit by using an output signal of a local oscillator;

a third unit detecting a deviation angle from a phase of a reference signal point of the phase information and determining an amount of correction based on the deviation angle;

a fourth unit converting transmission data into a first pair of amplitude data corresponding to a signal point thereof;

a fifth unit outputting a second pair of amplitude data corresponding to a phase obtained by adding the amount of correction to the phase of the signal point indicated by the first pair of amplitude data; and a sixth unit modulating the output signal of the local oscillator by using the second pair of amplitude data output by the fifth unit.

5. A radio communication apparatus comprising:

a first unit receiving a phase-modulated signal;

a second unit extracting phase information from the phase-modulated signal received by the first unit by using an output signal of a local oscillator;

a third unit detecting a deviation angle from a phase of a reference signal point of the phase information and determining an amount of correction based on the deviation angle;

a fourth unit converting transmission data into phase information concerning a signal point thereof;

a fifth unit adding the amount of correction to the phase information;

a sixth unit converting the phase information with the amount of correction added thereto into a pair of amplitude data; and a seventh unit modulating the output signal of the local oscillator by using the pair of amplitude data obtained by the sixth unit.

6. A radio communication apparatus comprising:

a first unit receiving a signal obtained by differential encoding;

a second unit delay-detecting the signal received by the first unit by using an output signal of a local oscillator, so that an amount of phase shifting is extracted;

a third unit determining an amount of correction based on an amount obtained by subtracting a reference amount of phase shifting from the amount of phase shifting extracted;

a fourth unit outputting an integrated amount of correction;

a fifth unit converting transmission data into a first pair of amplitude data corresponding to a signal point thereof;

a sixth unit outputting a second pair of amplitude data corresponding to a phase obtained by adding the integrated amount of correction to the phase of the signal point indicated by the first pair of amplitude data; and a seventh unit modulating the output signal of the local oscillator by using the second pair of amplitude data output by the sixth unit.

7. A radio communication apparatus comprising:

a first unit receiving a signal obtained by differential encoding;

a second unit delay-detecting the signal received by the first unit by using an output signal of a local oscillator, so that an amount of phase shifting is extracted;

a third unit determining an amount of correction based on an amount obtained by subtracting a reference amount of phase shifting from the amount of phase shifting;

a fourth unit outputting an integrated amount of correction;

a fifth unit converting transmission data into phase information corresponding to a signal point thereof;

a sixth unit adding the integrated amount of correction to the phase information;

a seventh unit converting the phase information with the integrated amount of correction added thereto output by the sixth unit into a pair of amplitude data; and an eighth unit modulating the output signal of the local oscillator by using the pair of amplitude data output by the seventh unit.

8. A radio communication apparatus comprising:

a first unit despreading a received signal from a party with which said radio communication apparatus communicates and detecting a deviation angle per pilot block due to a frequency error between the party and said radio communication apparatus by subjecting the despread received signal to a pilot synchronous detection;

a second unit determining an amount of correction based on the deviation angle detected by the first unit;

a third unit converting transmission data to be sent to the party into phase information concerning a signal point;

a fourth unit adding the amount of correction to the phase information;

a fifth unit converting the phase information with the amount of correction added thereto output by the fourth unit into a pair of amplitude data; and a sixth unit modulating a carrier wave for transmission by the pair of amplitude data output by the fifth unit and transmitting a modulated carrier wave to the party.

9. A radio communication apparatus comprising:

a first unit receiving, in an information unit, a phase-modulated signal from a party with which said radio communication apparatus communicates;

a second unit extracting phase information contained in at least one information unit of the phase-modulated signal received by the first unit;

a third unit detecting a deviation angle from a phase of a reference signal point of phase information concerning the information unit;

a fourth unit determining an amount of correction based on the deviation angle detected by the third unit;

a fifth unit storing the amount of correction determined by the fourth unit in the information unit;

a sixth unit converting transmission data in the information unit into phase information of a signal point thereof;

a seventh unit adding the amount of correction to the phase information in the information unit;

an eighth unit converting the phase information with the amount of correction added thereto output by the seventh unit into a pair of amplitude data; and a ninth unit modulating a carrier wave in the information unit by using the pair of amplitude data and transmitting a modulated carrier wave to the party.

10. The radio communication apparatus as claimed in claim 9, wherein the fourth unit comprises a unit smoothing the deviation angle in the information unit and determining another amount of correction based on an average deviation angle in the information unit.

* * * * *